(12) United States Patent
Chen et al.

(10) Patent No.: US 10,670,916 B2
(45) Date of Patent: Jun. 2, 2020

(54) LIGHT GUIDING FILM, DIRECT TYPE BACKLIGHT MODULE AND DISPLAY DEVICE

(71) Applicants: Beijing BOE Optoelectronics Technology Co., Ltd., Beijing (CN); BOE TECHNOLOGY GROUP CO., LTD., Beijing (CN)

(72) Inventors: Yinwei Chen, Beijing (CN); Liang Xiao, Beijing (CN); Yezhou Tan, Beijing (CN); Jie Cai, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/242,731

(22) Filed: Jan. 8, 2019

(65) Prior Publication Data

US 2019/0324326 A1  Oct. 24, 2019

(30) Foreign Application Priority Data

Apr. 18, 2018  (CN) .......................... 2018 1 0350516

(51) Int. Cl.
*G02F 1/1335* (2006.01)
*G02F 1/13357* (2006.01)

(52) U.S. Cl.
CPC .. *G02F 1/133606* (2013.01); *G02F 1/133603* (2013.01); *G02F 1/133605* (2013.01); *G02F 2001/133607* (2013.01)

(58) Field of Classification Search
None
See application file for complete search history.

(56) References Cited

U.S. PATENT DOCUMENTS

| 9,658,380 B2 | 5/2017 | Miyashita | |
| 2008/0007972 A1* | 1/2008 | Kuo | G02F 1/1339 |
| | | | 362/633 |
| 2008/0094855 A1* | 4/2008 | Yu | G02B 6/009 |
| | | | 362/634 |

(Continued)

FOREIGN PATENT DOCUMENTS

| CN | 201412745 Y | 2/2010 |
| CN | 201757337 U | 3/2011 |

(Continued)

OTHER PUBLICATIONS

Chinese Office Action dated Aug. 19, 2019, from application No. 201810350516.7.

*Primary Examiner* — Elmito Breval
(74) *Attorney, Agent, or Firm* — Foley & Lardner LLP

(57) ABSTRACT

The present disclosure relates to the field of display technology, and provides a light guiding film. The light guiding film includes a plurality of prism bodies arranged as an array. Each of the plurality of prism bodies has a first surface and a second surface oppositely disposed. The first surface is a light exiting surface. A space is disposed between two adjacent prism bodies. The prism body is configured to refract light incident into the space to form refracted light, such that the refracted light is totally reflected in the prism body to form total reflection light.

9 Claims, 6 Drawing Sheets

(56) References Cited

U.S. PATENT DOCUMENTS

| | | | | |
|---|---|---|---|---|
| 2010/0002169 | A1* | 1/2010 | Kuramitsu | G02B 6/0021 349/65 |
| 2012/0300135 | A1* | 11/2012 | Cho | G02B 6/0021 348/739 |
| 2013/0258663 | A1* | 10/2013 | Woodgate | F21K 9/00 362/236 |
| 2014/0016314 | A1* | 1/2014 | Woodgate | F21K 9/00 362/235 |
| 2015/0036114 | A1* | 2/2015 | Schadt | H01L 25/0753 355/67 |
| 2015/0049511 | A1* | 2/2015 | Tarsa | G02B 6/0021 362/612 |
| 2015/0077976 | A1* | 3/2015 | Jiang | F21V 5/04 362/97.2 |
| 2015/0253491 | A1* | 9/2015 | Laycock | G02B 6/0043 362/606 |
| 2016/0041326 | A1* | 2/2016 | Chang | G02B 6/0021 362/97.3 |
| 2017/0098743 | A1* | 4/2017 | Chen | H01L 33/507 |
| 2017/0160591 | A1* | 6/2017 | Cho | G02B 5/0257 |
| 2017/0192150 | A1* | 7/2017 | Bang | G02B 6/0023 |
| 2018/0136520 | A1* | 5/2018 | Kim | G02B 6/0021 |

FOREIGN PATENT DOCUMENTS

| | | |
|---|---|---|
| CN | 104132282 A | 11/2014 |
| CN | 206234698 U | 6/2017 |
| CN | 107656398 A | 2/2018 |

* cited by examiner

LIGHT GUIDING FILM, DIRECT TYPE BACKLIGHT MODULE AND DISPLAY DEVICE

CROSS REFERENCE

This application is based upon and claims priority to Chinese Patent Application No. 201810350516.7, filed on Apr. 18, 2018, the entire contents thereof are incorporated herein by reference.

TECHNICAL FIELD

The present disclosure relates to the field of display technology, and in particular, to a light guiding film, a direct type backlight module having the same, and a display device.

BACKGROUND

With the wide application of liquid crystal display technology, the information display technology has made great progress, and people have put forward higher requirements for the display device. For example, display modules with higher resolution, more vivid display effects, higher brightness and light efficiency have become the design direction of the majority of technology developers. However, since the liquid crystal itself does not have a light emitting property, the liquid crystal display needs to be provided an illumination source by using a backlight module, a more efficient and compact backlight design is an important direction for improving the display performance of the liquid crystal display.

It should be noted that the information disclosed in the background section above is only for enhancing the understanding of the background of the present disclosure, and thus may include information that does not constitute prior art known to those ordinary skilled in the art.

SUMMARY

The present disclosure provides a light guiding film having a small light mixing distance, a direct type backlight module having the same, and a display device.

The additional aspects and advantages of the present disclosure will be set forth in part in the following description, and will become apparent from the description in part, or may be learned by the practice of the present disclosure.

According to an aspect of the present disclosure, a light guiding film is provided. The light guiding film includes a plurality of prism bodies arranged as an array. Each of the prism bodies has a first surface and a second surface oppositely disposed. The first surface is a light exiting surface, and a space is disposed between two adjacent prism bodies. The prism body is configured to refract light incident into the space to form refracted light, such that the refracted light is totally reflected in the prism body to form total reflection light.

In an exemplary arrangement of the present disclosure, the light guiding film further includes a reflective dot layer disposed on the second surface and configured to reflect the total reflection light such that the total reflection light is emitted through the first surface.

In an exemplary arrangement of the present disclosure, a cross-sectional of the space taken along a surface perpendicular to the second surface has a shape of an isosceles acute triangle.

In an exemplary arrangement of the present disclosure, an apex angle of the isosceles acute triangle is greater than 0 degree and less than or equal to 20 degrees.

In an exemplary arrangement of the present disclosure, a cross-sectional of the space taken along a surface perpendicular to the second surface has a shape of an isosceles acute triangle, and an apex angle of the isosceles acute triangle is rounded.

In an exemplary arrangement of the present disclosure, a cross-sectional of the space taken along a surface perpendicular to the second surface has a shape of a pentagon. An apex angle of the pentagon is an acute angle and the pentagon has an axisymmetric structure along a bisector of the acute angle.

In an exemplary arrangement of the present disclosure, the prism body further includes a convex portion disposed on the first surface and configured to totally reflect light incident thereon.

In an exemplary arrangement of the present disclosure, the apex angle of the pentagon is greater than or equal to 30 degrees and less than 90 degrees, and the convex portion is disposed at a first position on the first surface, wherein the light refracted at a light incident surface of the prism body is incident at the first position.

In an exemplary arrangement of the present disclosure, the plurality of prism bodies, arranged as an array, are formed in an integrated structure.

In an exemplary arrangement of the present disclosure, the space has one or more of a pyramid shape, a conical shape, and a prism shape extending along the second surface.

According to an aspect of the present disclosure, a direct type backlight module is provided. The direct type backlight module includes a substrate, a light source disposed on the substrate, and a light guiding film disposed on the substrate. The light guiding film includes a plurality of prism bodies arranged as an array. Each prism body has a first surface and a second surface oppositely disposed. The first surface is a light exiting surface, and a space is disposed between two adjacent prism bodies. The prism body is configured to refract light incident into the space to form refracted light, such that the refracted light is totally reflected in the prism body to form total reflection light. The light source is located in the space.

In an exemplary arrangement of the present disclosure, a cross-sectional of the space taken along a surface perpendicular to the second surface has a shape of an isosceles acute triangle.

In an exemplary arrangement of the present disclosure, a cross-sectional of the space taken along a surface perpendicular to the second surface has a shape of an isosceles acute triangle, and an apex angle of the isosceles acute triangle is rounded.

In an exemplary arrangement of the present disclosure, a cross-sectional of the space taken along a surface perpendicular to the second surface has a shape of a pentagon, and wherein an apex angle of the pentagon is an acute angle and the pentagon has an axisymmetric structure along a bisector of the acute angle.

In an exemplary arrangement of the present disclosure, the prism body further includes a convex portion disposed on the first surface and configured to totally reflect the light incident thereon.

In an exemplary arrangement of the present disclosure, the apex angle of the pentagon is greater than or equal to 30 degrees and less than 90 degrees, and the convex portion is located at a first position on the first surface. The light refracted at a light incident surface of the prism body is incident on the first position.

In an exemplary arrangement of the present disclosure, the prism body further includes a reflective dot layer disposed on the second surface and configured to reflect the total reflection light such that the total reflection light is emitted through the first surface.

In an exemplary arrangement of the present disclosure, the reflective dot layer is bonded to the substrate.

In an exemplary arrangement of the present disclosure, the direct type backlight module further includes a first brightness enhancement film disposed on the first surface. The direct type backlight module further includes a diffusion film disposed on a side of the first brightness enhancement film away from the light guiding film. The direct type backlight module further includes a second brightness enhancement film disposed between the first brightness enhancement film and the diffusion film. A prism body on the second brightness enhancement film and another prism body on the first brightness enhancement film are disposed perpendicular to each other.

According to an aspect of the present disclosure, a display device is provided. The display device includes a direct type backlight module of any one of the above arrangements.

It is to be understood that both the foregoing general description and the following detailed description are exemplary and explanatory only and are not restrictive of the disclosure.

BRIEF DESCRIPTION OF THE DRAWINGS

The above and other features and advantages of the present disclosure will become more apparent from the detailed description of the exemplary arrangements by referring to the drawings.

DETAILED DESCRIPTION

Figure 1:
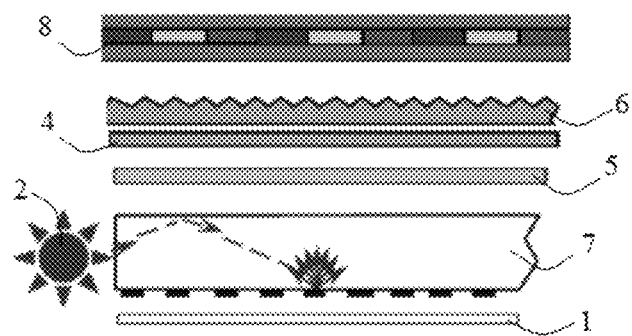
FIG. 1 is a schematic diagram of a basic structure of an edge-light backlight module.

Exemplary arrangements will now be described more fully with reference to the drawings. However, the exemplary arrangements can be embodied in various forms and should not be construed as being limited to the examples set forth herein; rather, these arrangements are provided so that the present disclosure will be more comprehensive and complete, and the conception of the exemplary arrangements will be fully conveyed to those skilled in the art. The same reference numerals in the drawings denote the same or similar parts, and the repeated description thereof will be omitted.

Referring to the basic structure diagram of the edge-light backlight module shown in FIG. 1, the light emitted by a light source 2 (LED) is reflected by a light guiding plate 7 and then propagates upward, and then the brightness of the light in the positive angle is increased through a first brightness enhancement film 4 and a second brightness enhancement film 6, and then the light passes through the diffusion film 5 to be surface softened and balanced to achieve a desired surface light source effect to provide a backlight source for a color film substrate 8. As the light is reflected many times in the light guiding plate 7 and there is an obvious light leakage at the edge, the light energy efficiency of the edge-light backlight structure is generally low. At the same time, the light guiding plate of the edge-light backlight cannot achieve local region brightness control, and does not meet the display requirement of HDR high dynamic light rendering, so the contrast of the display screen cannot be further improved.

The present disclosure first provides a light guiding film which may include a plurality of prism bodies 31 arranged in an array, a reflective dot layer 34, and the like. The prism body has a first surface and a second surface disposed oppositely, the first surface is a light exiting surface, and a space 32 is disposed between two adjacent prism bodies 31, and a surface of the space surrounded by prism bodies is a light incident surface; the prism body 31 is capable of refracting incident light incident into the space 32 to form the refracted light, and causing the refracted light to be totally reflected in the prism body to form the total reflection light; the reflective dot layer 34 is disposed on the second surface and capable of reflecting the total reflection light to make it emit through the first surface.

The light guiding film of example arrangements of the present disclosure includes a plurality of prism bodies 31 arranged in array, and a space 32 is disposed between two adjacent prism bodies 31, the prism body 31 is capable of refracting incident light incident into the space 32 to form refracted light, and causing the refracted light to be totally reflected in the prism body to form the total reflection light; a reflective dot layer 34 is disposed on a second surface and capable of reflecting the total reflection light to make it emit through the first surface. On the one hand, the total reflection light has a longer propagation distance with respect to the incident light in the prism body 31, so that the light mixing distance is smaller, and a better light mixing effect can be achieved; on the other hand, the total reflection light is totally reflected only between two spaces 32, and the reflection times is less, therefore, the light efficiency is higher; on another hand, the light are uniformly emitted from the first surface after multiple reflections, the phenomenon of light and dark pattern, i.e., the hotspot phenomenon, is eliminated.

Examples of a light guiding film of the present disclosure will be described in detail below by three exemplary arrangements.

Exemplary Arrangement 1

Figure 2:
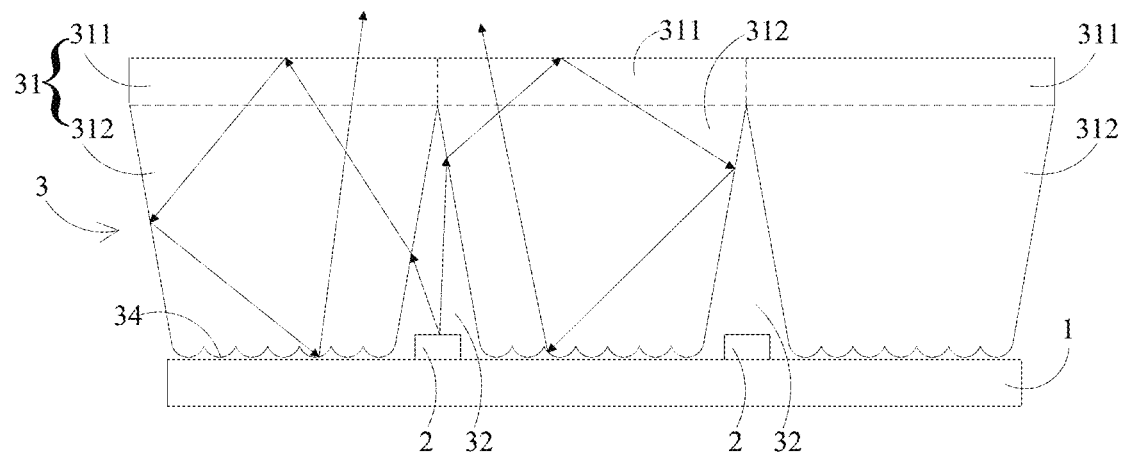
FIG. 2 is a schematic structural view of a light guiding film according to an exemplary arrangement of the present disclosure.

Referring to the schematic diagram of an exemplary arrangement of the light guiding film shown in FIG. 2, a light guiding film 3 is disposed on a substrate 1, and a light source 2 is further disposed on the substrate 1 and located in a space 32. In the present exemplary arrangement, the structure of each prism body 31 may be the same, a upper portion of the prism body 31 is disposed as a rectangular parallelepiped 311, and a lower portion is disposed as an inverted truncated pyramid 312, and the size of the upper top surface of the truncated pyramid 312 (i.e., a side surface in contact with the rectangular parallelepiped 311) is the same as the size of the surface of the rectangular parallelepiped 311, and the lower bottom surface of the truncated pyramid 312 is smaller than the upper top surface of the truncated pyramid 312. A plurality of rectangular parallelepipeds 311 are disposed to be bonded to each other, and the upper top surfaces of the plurality of rectangular parallelepipeds 311 form a first surface of the prism body layer. Since the lower portion of the prism body 31 is disposed as an inverted truncated pyramid 312, a space 32 is formed between the adjacent two prism bodies 31, and a cross-sectional of the space 32 taken along a surface perpendicular to the second surface has a shape of an isosceles acute triangle. That is, the cross-sectional shape of the space surrounded by the side surfaces of the adjacent two prism bodies 31 and the substrate 1 is an isosceles acute triangle, and the apex angle is formed by the side surfaces of the adjacent two prism bodies 31. The apex angle of the isosceles acute triangle is greater than 0 degree and less than or equal to 20 degrees. Of course, the apex angle is not limited to the above description as long as the refracted light can be totally reflected in the prism body 31. The apex angle may also be configured such that an angle between the refracted light and the first surface is smaller than an angle between the incident light and the first surface, so that the propagation distance of the refracted light is larger than the incident light, thus achieving better light mixing effect and shortening the light mixing distance.

Exemplary Arrangement 2

Figure 3:
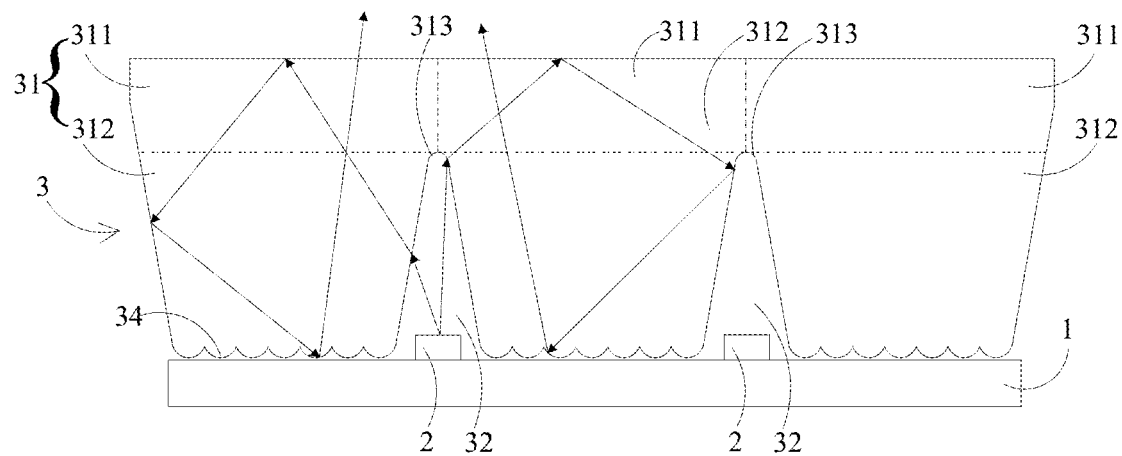
FIG. 3 is a schematic structural view of a light guiding film according to another exemplary arrangement of the present disclosure.

Referring to the structural schematic diagram of another exemplary arrangement of the light guiding film shown in FIG. 3, a light guiding film 3 is disposed on a substrate 1 and a light source 2 is further disposed on the substrate 1 and located in a space 32. In the present exemplary arrangement, the structure of the prism body 31 disposed at the periphery is slightly different from the structure of the prism body 31 disposed at the center.

The upper portion of the prism body 31 disposed at the center is disposed as a rectangular parallelepiped 311, and the lower portion is disposed as an inverted truncated pyramid 312. The upper top surface of the truncated pyramid 312 (i.e., a side surface in contact with the rectangular parallelepiped 311) has the same shape as the surface of the rectangular parallelepiped 311 (i.e., the lower bottom surface of the rectangular parallelepiped 311), but is smaller in size than the lower bottom surface of the rectangular parallelepiped 311. And the lower bottom surface of the rectangular parallelepiped 311 forms an obtuse angle with the side surface of the truncated pyramid 312, which is a round chamfer 313, so that the outer peripheral side surface of the truncated pyramid 312 is transitioned to the periphery of the lower bottom surface of the rectangular parallelepiped 311 by a circular arc. The lower bottom surface of the truncated pyramid 312 is smaller than the upper top surface of the truncated pyramid 312. The plurality of rectangular parallelepipeds 311 are disposed to be bonded to each other. The upper top surfaces of the plurality of rectangular parallelepipeds 311 form a first surface of the prism body layer. Since the lower portion of the prism body 31 is disposed as the inverted truncated pyramid 312, the space 32 is formed between the adjacent two prism bodies 31, that is, a space surrounded by the side surfaces of the adjacent two prism bodies 31 and the substrate 1 is the space 32. In the present exemplary arrangement, the cross-sectional of the space 32 taken along a plane perpendicular to the second surface has a shape of substantially an isosceles acute triangle, and the apex angle is rounded to form an angle with a circular arc. The apex angle is formed by a transition arc between the rectangular parallelepiped 311 and the truncated pyramid 312 of the adjacent two prism bodies 31, and the remaining portion is formed by the side faces of the adjacent two prism bodies 31. The apex angle is provided as a circular angle to avoid forming the sharp angle in the first arrangement to further reduce the thickness of the prism body 31; and in the actual mold processing, it is easier to be manufactured and reduce processing defects. Moreover, since the radius of curvature of the spherical surface of the apex angle is small, the light emitted from the center of the light source 2 has a large divergence angle through the refraction of the spherical surface, thus achieving the effect of uniform light.

The difference between the prism body 31 disposed at the periphery and the prism body 31 disposed at the center is that the side of the prism body 31 disposed at the periphery facing the outside may be configured as an inclined surface, or may be configured as a vertical surface perpendicular to the first surface or the second surface.

Exemplary Arrangement 3

Figure 4:
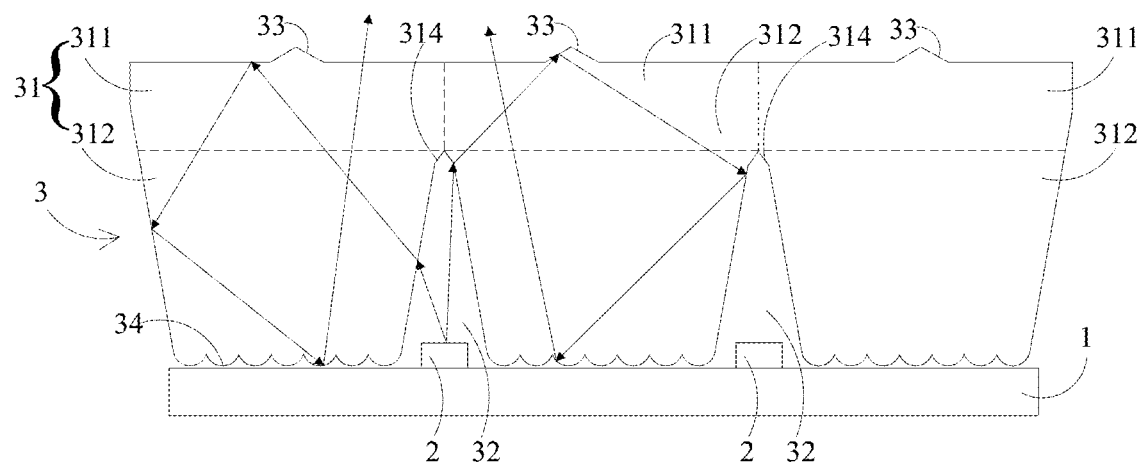
FIG. 4 is a schematic structural view of a light guiding film according to yet another exemplary arrangement of the present disclosure.

Referring to the structural schematic diagram of still another exemplary arrangement of the light guiding film shown in FIG. 4, a light guiding film 3 is disposed on a substrate 1, and a light source 2 is further disposed on the substrate 1 and located in a space 32. In the present exemplary arrangement, the structure of the prism body 31 disposed at the periphery is slightly different from the structure of the prism body 31 disposed at the center.

The upper portion of the prism body 31 disposed at the center is disposed as a rectangular parallelepiped 311, and the lower portion is disposed as an inverted truncated pyramid 312. The upper top surface of the truncated pyramid 312 (i.e., a side surface in contact with the rectangular parallelepiped 311) has the same shape as the surface of the rectangular parallelepiped 311 (i.e., the lower bottom surface of the rectangular parallelepiped 311), but is smaller in size than the lower bottom surface of the rectangular parallelepiped 311. And the lower bottom surface of the rectangular parallelepiped 311 forms an obtuse angle with the side surface of the truncated pyramid 312, which is an oblique chamfer 314, so that the outer peripheral side surface of the truncated pyramid 312 is transitioned to the periphery of the lower bottom surface of the rectangular parallelepiped 311 by an inclined surface. The lower bottom surface of the truncated pyramid 312 is smaller than the upper top surface of the truncated pyramid 312. The plurality of rectangular parallelepipeds 311 are disposed to be bonded to each other. The upper top surfaces of the plurality of rectangular parallelepiped 311 form a first surface of the prism body layer. Since the lower portion of the prism body 31 is disposed as an inverted truncated pyramid 312, a space 32 is formed between the adjacent two prism bodies 31, that is, a space surrounded by the side surfaces of the adjacent two prism bodies 31 and the substrate 1 is the space 32. In the present exemplary arrangement, the cross-sectional of the space 32 taken along a surface perpendicular to the second surface has a shape of a pentagon formed by splicing an isosceles trapezoid and an isosceles acute triangle. As shown in FIG. 4, the upper portion of the pentagon is an isosceles acute triangle, and the bottom edge of the isosceles acute triangle coincides with the top edge of an isosceles trapezoid, and the apex angle of the isosceles acute triangle (i.e., the apex angle of the pentagon) is greater than or equal to 30 degrees and less than 90 degrees. In the present disclosure, such a pentagon may also be referred to as an "isosceles pentagon". The isosceles acute triangle is formed by a transitional slope between the rectangular parallelepiped 311 and the truncated pyramid 312 of the adjacent two prism bodies 31, and the isosceles trapezoidal is formed by the side surfaces of the adjacent two prism bodies 31. The apex angle is disposed as a larger apex angle to avoid forming the sharp angle in the first arrangement to further reduce the thickness of the prism body 31; and it is easier to manufacture and reduce processing defects in actual mold processing. The angle between the extension lines of the two waist sides of the isosceles trapezoid is greater than 0 degree and less than or equal to 20 degrees.

The difference between the prism body 31 disposed at the periphery and the prism body 31 disposed at the center is that the side of the prism body 31 disposed at the periphery facing the outside may be configured as an inclined surface, or may be configured as a vertical surface perpendicular to the first surface or the second surface.

In the present exemplary arrangement, the light guiding film 3 may further include a convex portion 33 disposed on the first surface, and the convex portion 33 can totally reflect the light incident thereon to avoid that the refracted light refracted by the isosceles acute triangle position above the isosceles trapezoid does not meet the total reflection requirement. For example, as shown in FIG. 4, as the apex angle of the isosceles acute triangle above the isosceles trapezoid increases, the position on the first surface on which the light refracted by the two sides of the isosceles acute triangle is incident becomes closer to the isosceles acute triangle, and the incident angle on the first surface becomes smaller. When the incident angle decreases to be less than the critical angle of the total reflection, a part of the light will not be totally reflected. Therefore, the position of the convex portion is disposed at a position on the first surface to which light refracted at a light incident surface of the prism body is incident, that is, located at a first position on the first surface to which the light refracted at the two sides of the isosceles acute triangle is incident, thus increasing the incident angle of the light at that portion to ensure that the light refracted by the two sides of the isosceles acute triangle can be totally reflected.

Figure 5:
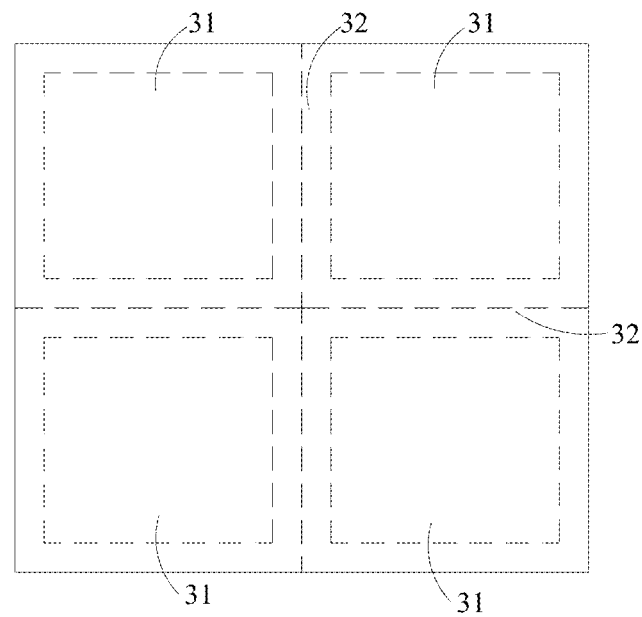
FIG. 5 is a schematic top view showing a structure in which a space is a prism extending along a second surface.
Figure 6:
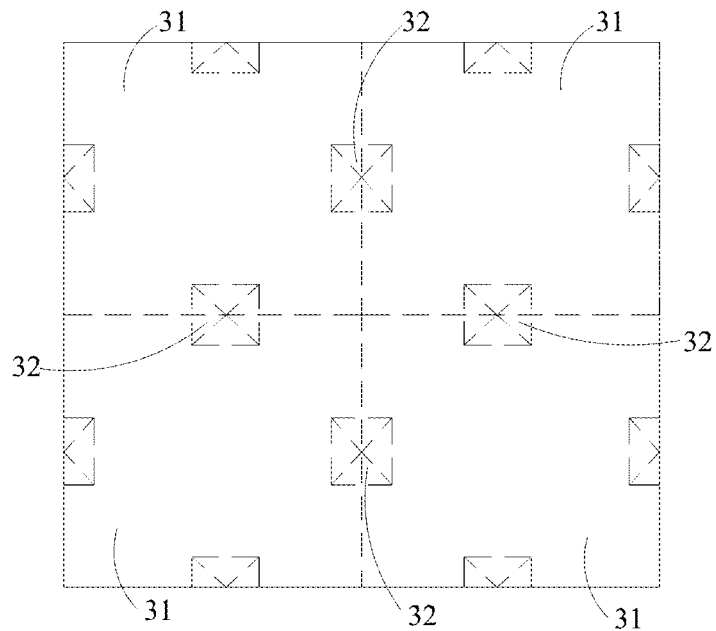
FIG. 6 is a schematic top view showing a structure in which the space is a pyramid.

Referring to a schematic top view showing a prismatic structure in which a space is extended along a second surface shown in FIG. 5, the spaces 32 in the above three exemplary arrangements are all prisms along the second surface, that is, the spaces 32 are interconnected to each other, and the periphery of each prism bodies 31 is disposed with a through space 32. It can be understood by those skilled in the art that the space 32 can also be disposed in a pyramid shape or a conical shape. Referring to a schematic top view showing a rectangular structure in which the space is a pyramid shown in FIG. 6, that is, the pyramid or the cone is formed with the substrate 1 as the bottom and the side of the prism body 31 as the side. With this arrangement, the spaces 32 are not interconnected to each other and are independent spaces.

The prism body layer in the above three exemplary arrangements may be integrally formed, and is divided into a plurality of parts for convenience of description of its structure.

The prism body layer can be processed from a high transmittance optical material, such as PMMA (polymethyl methacrylate), PC (polycarbonate) or UV (ultraviolet curing) glue, etc., and a light guiding layer structure having a microprism structure is formed by injection molding or curing.

A reflective dot layer 34 can be disposed on the second surface and is capable of reflecting the total reflection light such that the total reflection light emit through the first surface. The refracted light is totally reflected in the prism body layer several times and then incident on the reflective dot layer 34, and then is reflected by the reflective dot layer 34 and emits through the first surface.

Further, the present disclosure further provides a direct type backlight module. The direct type backlight module may include a substrate 1, a light source 2, a light guiding film 3, and the like. The light source 2 is disposed on the substrate 1, the light guiding film 3 is disposed on the substrate 1, the reflective dot layer 34 is bonded to the substrate 1, and the light source 2 is located in the space 32.

The light source 2 can be an array of LED chips, and the LED chips can be fixed on the substrate 1 one by one by a transfer technology to form an array arrangement. The substrate 1 for fixing the LED chip may be a PCB printed circuit board or a glass substrate 1 coated with a conductive material, and the pins of the LED chip are connected by conductive traces. In general, the light emitted by the LED chip is in the blue light band, and the white light display effect can be realized by coating the yellow phosphor or RG powder on the upper portion of the LED chip. Under the control of the driving chip, the LED chip array can be divided into several regions to be independently lit, realizing the region control, and each brightness region has a plurality of adjustable gray levels.

Figure 7:
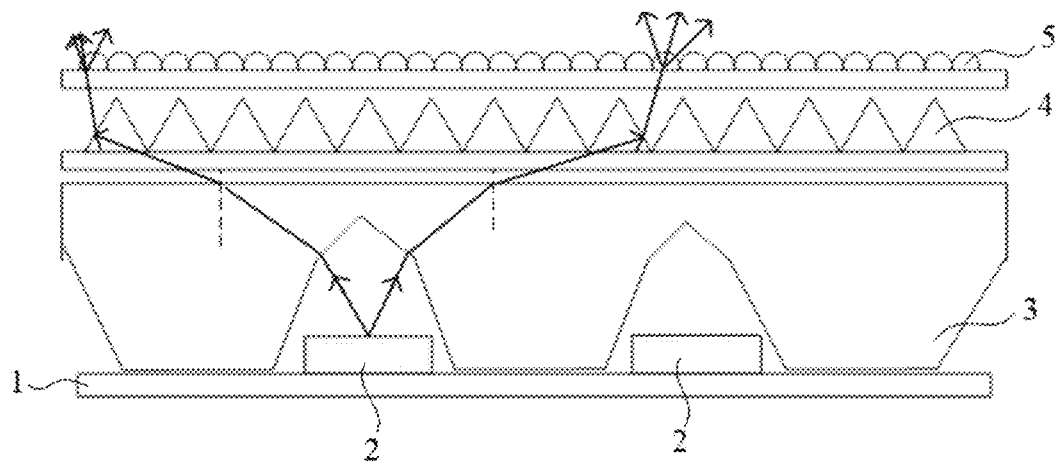
FIG. 7 is a schematic structural view of a direct type backlight module according to an exemplary arrangement of the present disclosure.

Referring to a schematic structural view of an exemplary arrangement of a direct type backlight shown in FIG. 7, the direct type backlight module may further include a first brightness enhancement film 4, a diffusion film 5, and the like. The first brightness enhancement film 4 is disposed on the first surface, and brightness of the light in the positive angle is increased through the first brightness enhancement film 4. The diffusion film 5 is disposed on a side of the first brightness enhancement film 4 away from the light guiding film 3, and the defect existing on the backlight module is eliminated by the scattering of the diffusion film 5 to obtain a uniform backlight effect.

Figure 8:
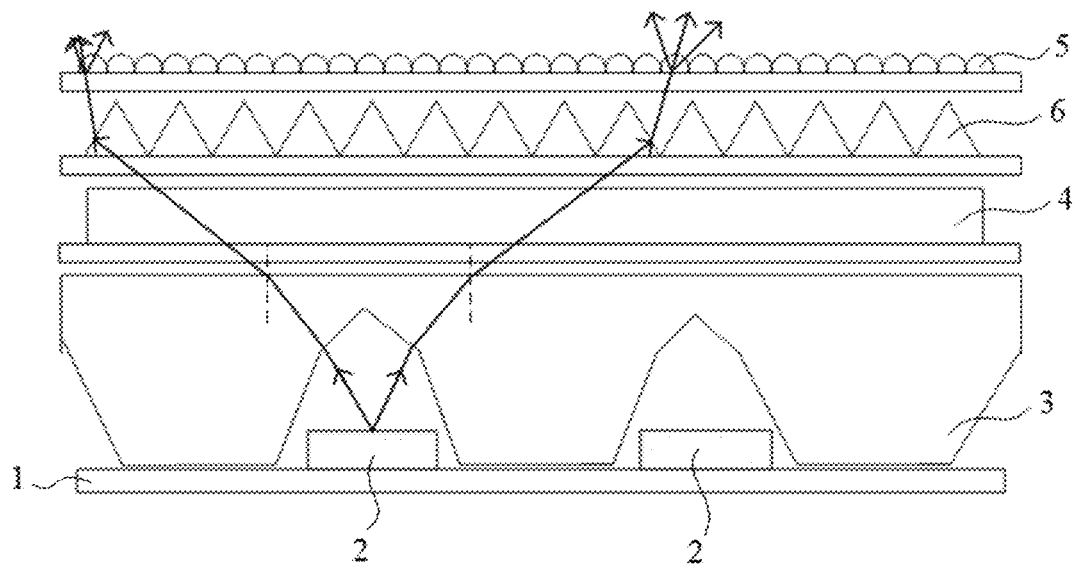
FIG. 8 is a schematic structural view of a direct type backlight module according to another exemplary arrangement of the present disclosure.

Referring to a schematic structural view of another example arrangement of the direct type backlight module shown in FIG. 8, the direct type backlight module further includes a second brightness enhancement film 6 disposed between the first brightness enhancement film 4 and the diffusion film 5. And the prism body on the second brightness enhancement film 6 and the prism body on the first brightness enhancement film 4 are disposed perpendicular to each other.

Compared with the edge-light type backlight module, the direct type backlight module of exemplary arrangements of the present disclosure can avoid leakage of large-angle light, thus improving the backlight efficiency. The screen can be designed without a frame. The backlight module has a compact stack structure without an air layer, which can avoid structural deformation, improve the service life of the backlight module, and reduce product defects.

Figure 9:
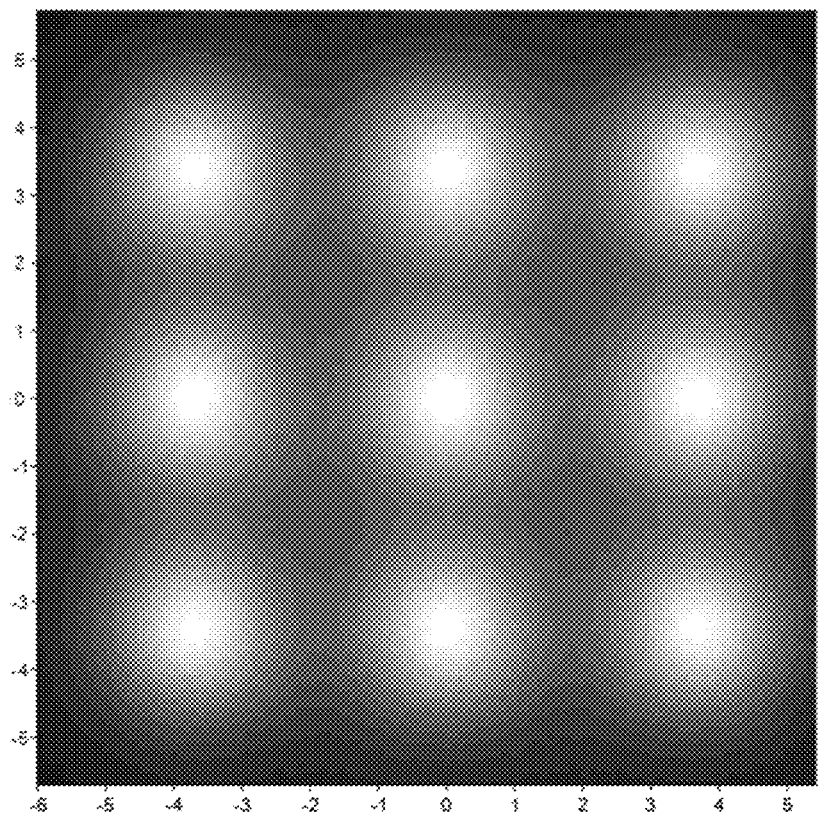
FIG. 9 is a schematic diagram showing a surface illumination distribution of a backlight module in the comparison example.
Figure 10:
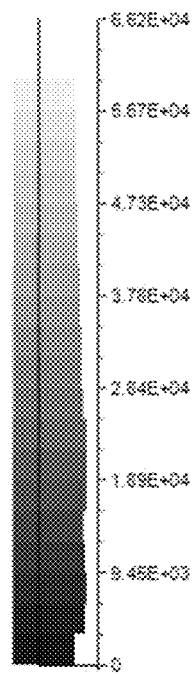
FIG. 10 is a schematic diagram of the illumination distribution coordinates corresponding to FIG. 9.
Figure 11:
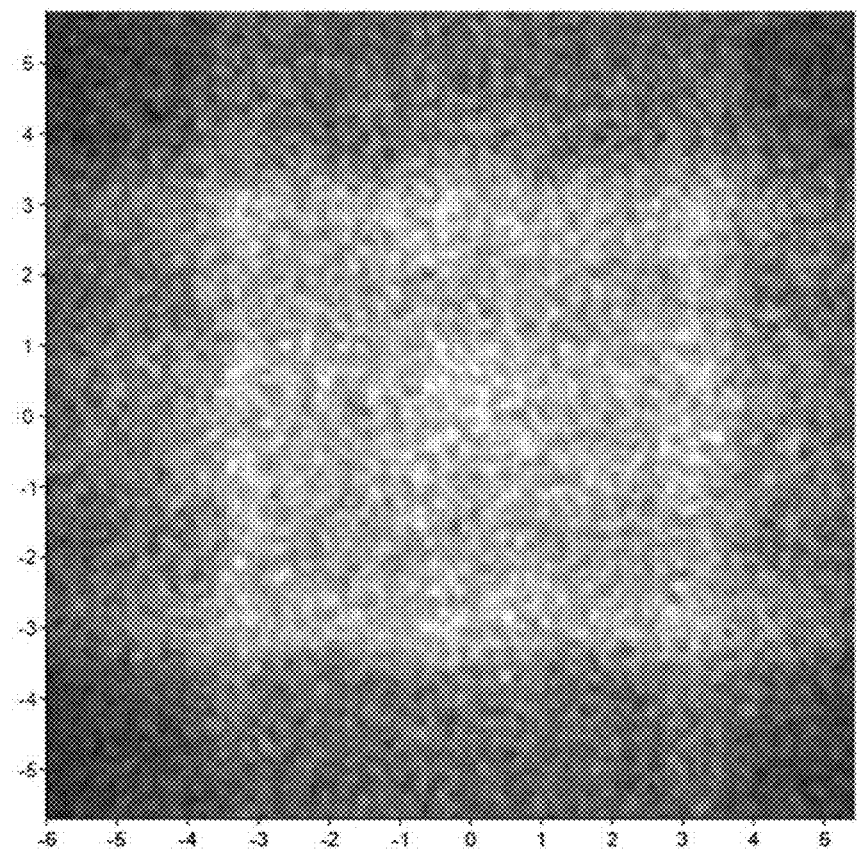
FIG. 11 is a schematic diagram showing the surface illumination distribution of the direct type backlight module of an exemplary arrangement of the present disclosure.
Figure 12:
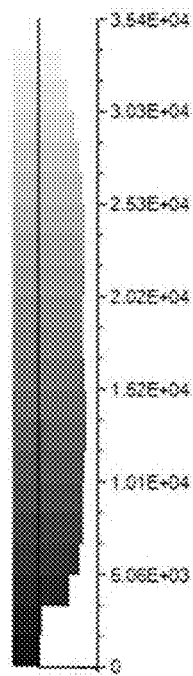
FIG. 12 is a schematic diagram of the illumination distribution coordinates corresponding to FIG. 11.

The optical structure of the backlight module in the comparison example is established by optical simulation software, and the uniformity of illumination at the upper surface of the backlight module is counted by the light receiver. Referring to the schematic diagram of the surface illumination distribution of the backlight module of the comparison example shown in FIG. 9 and the corresponding illumination distribution coordinate diagram as shown in FIG. 10, when the light guiding film 3 of exemplary arrangements of the present disclosure is not adopted, obvious highlights are formed on the receiver, and the light distribution is very uneven. Referring to a schematic diagram showing the surface illumination distribution of the direct type backlight module of an exemplary arrangement of the present disclosure shown in FIG. 11, and the corresponding illumination distribution coordinate diagram as shown in FIG. 12, when the light guiding film 3 is added to the optical structure of the established backlight module, and after tracking the light, the uniformity of illumination distribution on the receiver can be significantly improved to achieve the ideal illumination effect of the surface light source. In FIG. 9 and FIG. 11, white indicates high illumination and black indicates low illumination. The coordinate values in FIG. 10 and FIG. 12 indicate the variation range, which can be used as a standard for evaluating the surface brightness uniformity. It can be seen from FIG. 10 that the maximum white illumination in FIG. 9 is about 6620, and it can be seen from FIG. 12 that the maximum white illumination in FIG. 11 is about 3540, indicating that the overall uniformity of the latter is better. The length of each column block indicates the proportion of the points having corresponding illumination range.

The direct type backlight module of exemplary arrangements of the present disclosure has a large backlight a view due to the light-emitting characteristics of the direct type backlight module, and has a wide viewing angle illumination effect.

Further, exemplary arrangements of the present disclosure further provide a display device including the above-described direct type backlight module. The specific structure of the direct type backlight module has been described in detail above, and will not be described herein.

It can be seen from the above technical solutions that the present disclosure has at least one of the following advantages and positive effects. The light guiding film of the present disclosure includes a plurality of prism bodies arranged in an array, and a space is disposed between two adjacent prism bodies, and the prism body can refract incident light incident into the space to form refracted light and cause the refracted light to be totally reflected in the prism body to form the total reflection light. On the one hand, the total reflection light has a longer propagation distance with respect to the incident light in the prism body, so that the light mixing distance is smaller, and a better light mixing effect can be achieved; on the other hand, the total reflection light is totally reflected only between two spaces, and the reflection times is less, therefore, the light efficiency is higher; on another hand, the light are uniformly emitted from the first surface after multiple reflections, the phenomenon of light and dark pattern, i.e., the hotspot phenomenon, is eliminated.

The features, structures, or characteristics described above may be combined in any suitable manner in one or more arrangements, and the features discussed in the various arrangements are interchangeable, if possible. In the description above, numerous specific details are set forth to provide a thorough understanding of the arrangements of the present disclosure. However, one skilled in the art will appreciate that the technical solutions of the present disclosure can be practiced when one or more of the described specific details may be omitted or other methods, components, materials, etc. may be employed. In other cases, well-known structures, materials or operations are not shown or described in detail to avoid obscuring each aspect of the present disclosure.

The word "about" as used in the present description generally means within 20%, preferably within 10%, and more preferably within 5% of a given value or range. In the present disclosure, the described quantiles are approximate quantities, that is, even without specific description, the meaning of "about" or "approximately" may be implied.

Although the relative terms such as "upper" and "lower" are used in the description to describe the relative relationship of one component to another component, these terms are used in this description for convenience only, for example, direction according to the example described in the drawing. It will be understood that if the device of the icon is flipped upside down, the component described "above" will become the component "below". Other relative terms such as "high", "low", "top" and "bottom" also have similar meanings. When a structure is "on" another structure, it is possible that a structure is integrally formed on another structure, or that a structure is "directly" disposed on another structure, or that a structure is "indirectly" disposed on other structures through another structure.

In the present description, the terms "a", "an", "the", "said" and "at least one" is used to indicate the presence of one or more elements/components/etc.; The term "comprising", "including" and "having" are used to mean open-ended including, there may be additional elements/components/etc. in addition to the listed elements/components/etc.; and the terms "first", "second" and "third" etc. are used only as markers only, and do not limit the number of objects.

It should be understood that the present disclosure does not limit its application to the detailed structure and arrangement of the components proposed in the present description. The present disclosure can have other arrangements and can be implemented and executed in a variety of ways. The foregoing variations and modifications are within the protection scope of the present disclosure. The present disclosure disclosed and defined in the present description extends to all alternative combinations of two or more individual features mentioned or apparent in the text and/or in the drawings. All of these different combinations constitute multiple alternative aspects of the present disclosure. The arrangements described in the description are illustrative of the best mode for implementing the present disclosure and will enable those skilled in the art to utilize the present disclosure.

What is claimed is:

1. A direct type backlight module, comprising:
   a substrate;
   a light source disposed on the substrate; and a light guiding film disposed on the substrate, the light guiding film comprising a plurality of prism bodies arranged as an array, and having a first surface and a second surface oppositely disposed; wherein the first surface is a light exiting surface, and a respective space is disposed between two adjacent one of the plurality of prism bodies, each of the plurality of prism bodies is configured to refract light incident into the respective space to form refracted light, such that the refracted light is totally reflected in each of the plurality of prism bodies to form total reflection light, wherein the light source is located in the space, and wherein the direct type backlight module comprises:

a first brightness enhancement film disposed on the first surface;

a diffusion film disposed on a side of the first brightness enhancement film away from the light guiding film; and a second brightness enhancement film disposed between the first brightness enhancement film and the diffusion film;

wherein a second prism body on the second brightness enhancement film and a first prism body on the first brightness enhancement film are disposed perpendicular to each other.

2. The direct type backlight module according to claim 1, wherein a cross-sectional of the space taken along a surface perpendicular to the second surface has a shape of an isosceles acute triangle.

3. The direct type backlight module according to claim 1, wherein a cross-sectional of the space taken along a surface perpendicular to the second surface has a shape of an isosceles acute triangle, and an apex angle of the isosceles acute triangle is rounded.

4. The direct type backlight module according to claim 1, wherein a cross-sectional of the space taken along a surface perpendicular to the second surface has a shape of a pentagon, and wherein an apex angle of the pentagon is an acute angle and the pentagon has an axisymmetric structure along a bisector of the acute angle.

5. The direct type backlight module according to claim 4, wherein each of the plurality prism bodies further comprises:

a convex portion disposed on the first surface and configured to totally reflect the light incident thereon.

6. The direct type backlight module according to claim 5, wherein the apex angle of the pentagon is greater than or equal to 30 degrees and less than 90 degrees, and the convex portion is located at a first position on the first surface, wherein the light refracted at a light incident surface of each of the plurality of prism bodies is incident on the first position.

7. The direct type backlight module according to claim 1, wherein each of the plurality of prism bodies further comprises:

a reflective dot layer disposed on the second surface and configured to reflect the total reflection light such that the total reflection light is emitted through the first surface.

8. The direct type backlight module according to claim 7, wherein the reflective dot layer is bonded to the substrate.

9. A display device, comprising:

a direct type backlight module according to claim 1.

* * * * *